United States Patent
Chivukula et al.

(10) Patent No.: US 10,237,339 B2
(45) Date of Patent: Mar. 19, 2019

(54) STATISTICAL RESOURCE BALANCING OF CONSTRAINED MICROSERVICES IN CLOUD PAAS ENVIRONMENTS

(71) Applicant: Microsoft Technology Licensing, LLC, Redmond, WA (US)

(72) Inventors: Abhiram Chivukula, Seattle, WA (US); Gopal Kakivaya, Sammamish, WA (US); Matthew Snider, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 15/241,444

(22) Filed: Aug. 19, 2016

(65) Prior Publication Data
US 2018/0054477 A1 Feb. 22, 2018

(51) Int. Cl.
G06F 15/173 (2006.01)
H04L 29/08 (2006.01)
H04L 12/24 (2006.01)

(52) U.S. Cl.
CPC ........ *H04L 67/1008* (2013.01); *H04L 41/142* (2013.01)

(58) Field of Classification Search
CPC .......................... H04L 67/1008; H04L 41/142
See application file for complete search history.

(56) References Cited

U.S. PATENT DOCUMENTS 6,310,881 B1 * 10/2001 Zikan ...................... H04L 45/02
370/236
7,020,147 B1 * 3/2006 Amadon ............. H04L 12/2854
343/712
7,693,991 B2 4/2010 Greenlee et al.
8,447,881 B2 5/2013 Paramasivam et al.
8,578,028 B2 11/2013 Grigsby et al.
8,958,293 B1 2/2015 Anderson (Continued)

FOREIGN PATENT DOCUMENTS

CN 104135542 A 11/2014
CN 104780115 A 7/2015
CN 105007312 A 10/2015

OTHER PUBLICATIONS

Goodwell, Martin, "How to load-balance microservices at web-scale", Published on: Oct. 16, 2015. Available at: https://blog.ruxit.com/load-balancing-microservices/.

(Continued)

*Primary Examiner* — Richard G Keehn
(74) *Attorney, Agent, or Firm* — Ray Quinney & Nebeker, P.C.; James S. Bullough; Brandon K. Roper (57) ABSTRACT

A resource balancer for a cluster of nodes in a cloud computing system includes a load calculation module that receives load reports for respective load metrics associated with the nodes, wherein the load reports are indicative of respective loads on a plurality of resources provided by the nodes, calculates, based on the received load reports, an expected distribution of loads across the nodes for each load metric, and calculates, based on the expected distribution of loads, probabilities that each of the load metrics will exceed a respective predetermined capacity for each node. A load balancing module selectively balances, based on the calculated probabilities, the loads on the resources provided by the nodes.

20 Claims, 4 Drawing Sheets

(56) References Cited

U.S. PATENT DOCUMENTS

| | | |
|---|---|---|
| 9,191,285 B1 | 11/2015 | Isaacson |
| 2002/0099970 A1 | 7/2002 | Zhao et al. |
| 2003/0144894 A1 | 7/2003 | Robertson et al. |
| 2005/0193113 A1* | 9/2005 | Kokusho ............... G06F 9/5083 709/225 |
| 2007/0094651 A1* | 4/2007 | Stephens ............. H04L 67/1008 717/151 |
| 2009/0271798 A1 | 10/2009 | Iyengar et al. |
| 2010/0299437 A1 | 11/2010 | Moore |
| 2012/0209439 A1* | 8/2012 | Inoue .................... G06Q 10/04 700/291 |
| 2014/0181247 A1* | 6/2014 | Hindawi ............... H04L 41/044 709/217 |
| 2014/0189441 A1* | 7/2014 | Ishida ................. G06F 11/3006 714/47.3 |
| 2014/0379930 A1 | 12/2014 | Ferris |
| 2015/0046592 A1 | 2/2015 | Patel et al. |
| 2015/0271285 A1* | 9/2015 | Hindawi ............. H04L 67/1089 709/213 |
| 2016/0057214 A1 | 2/2016 | Anand et al. |
| 2017/0255875 A1* | 9/2017 | Chien .................... G06N 7/005 |

OTHER PUBLICATIONS

Behal, et al., "Cloud computing: Performance analysis of load balancing algorithms in cloud heterogeneous environment", In Proceedings of 5th International Conference on Confluence the Next Generation Information Technology Summit, Sep. 25, 2014, pp. 200-205.

* cited by examiner

FIG. 5

STATISTICAL RESOURCE BALANCING OF CONSTRAINED MICROSERVICES IN CLOUD PAAS ENVIRONMENTS

CROSS-REFERENCE TO RELATED APPLICATIONS

The present disclosure is related to U.S. patent application Ser. No. 14/852,233, filed on Sep. 11, 2015, which claims the benefit of U.S. Provisional Application No. 62/153,458, filed on Apr. 27, 2015. The entire disclosures of the applications referenced above are incorporated herein by reference.

FIELD

The present disclosure relates to cloud computing systems, and more particularly to balancing loads in cloud computing systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A cloud computing system provides shared storage and other resources to a plurality of users. The cloud computing system may include one or more data centers, each including clusters of hardware (i.e., nodes) implementing various services. For example, each of the nodes may implement one or more virtual machines (VMs) to provide services including, but not limited to, web servers, database servers, operating systems, etc., as well as access to functions provided by hardware components such as processors. In some examples, the cloud computing system implements a cloud Platform as a Service (PaaS) or other distributed systems platform. Remote users access the cloud computing system to use various applications implemented by respective ones of the VMs. For example only, the users access the cloud computing system via corresponding client stations (e.g., computers or other user devices).

The cloud computing system may include one or more management entities configured to allocate resources provided by respective nodes. For example, each node cluster may include a respective management entity (e.g., a resource manager or balancer) that selectively allocates the resources of the nodes in the node cluster to services associated with each of the users.

SUMMARY

A resource balancer for a cluster of nodes in a cloud computing system includes a load calculation module that receives load reports for respective load metrics associated with the nodes, wherein the load reports are indicative of respective loads on a plurality of resources provided by the nodes, calculates, based on the received load reports, an expected distribution of loads across the nodes for each load metric, and calculates, based on the expected distribution of loads, probabilities that each of the load metrics will exceed a respective predetermined capacity for each node. A load balancing module selectively balances, based on the calculated probabilities, the loads on the resources provided by the nodes.

A method of balancing loads across a cluster of nodes in a cloud computing system includes receiving load reports for respective load metrics associated with the nodes, wherein the load reports are indicative of respective loads on a plurality of resources provided by the nodes, calculating, based on the received load reports, an expected distribution of loads across the nodes for each load metric, calculating, based on the expected distribution of loads, probabilities that each of the load metrics will exceed a respective predetermined capacity for each node, and selectively balancing, based on the calculated probabilities, the loads on the resources provided by the nodes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A cloud computing system implementing a distributed systems platform includes a plurality of nodes arranged in clusters. Each cluster interfaces with one or more components configured to manage and coordinate various functions of the nodes in the cluster. For simplicity, the one or more components are generally referred to herein as a cluster management module. Although shown as a single module, various management functions may be performed across multiple locations and machines. The cluster management module manages and configures the nodes to provide services to client stations (i.e., computers or other user devices). For example, each of the nodes may be associated with one or more resources used to execute the provided services. The cluster management module manages communication between the nodes and allocates the resources of each of the nodes to various services requested by the client stations (e.g., based on resource availability and load balancing).

Allocating the resources of the nodes includes distributing and redistributing services among the nodes based on respective loads. For example only, the cluster management module may include a resource balancer or manager that receives information indicating the loads on each of the nodes in the cluster. Each of the nodes may have predetermined capacities or limits for respective resources. For example, each resource may have an associated load metric indicating the load on the resource. The resource balancer may selectively rebalance the loads (e.g., by reassigning services from nodes with relatively higher loads to nodes with relatively lower loads) if the load metrics indicate that the loads are not balanced across the nodes.

In other words, the resource balancer may be configured to attempt to achieve load "balance," which may correspond to substantially equivalent loads, for each load metric, for each of the nodes in a cluster. However, loads may vary at different rates for different nodes, and some loads may experience significant load increases at a high rate (i.e., spikes). If one or more nodes are experiencing relatively high loads (e.g., near a load capacity or limit), a node that experiences higher load variance rates may have a greater risk of exceeding a load capacity than nodes that have relatively stable (i.e., unchanging or slowly changing) loads.

Resource balancing systems and methods according to the principles of the present disclosure are configured to monitor load metrics of nodes in a cluster, determine respective likelihoods (i.e., probabilities) that any of the load metrics will exceed associated capacities, and rebalance loads based on the determination. In this manner, the likelihood that the load for any resource on any node will exceed the associated capacity can be minimized. For example, a resource balancer according to the present disclosure may be configured to process the load metrics associated with the nodes in a cluster as random variables (e.g., aggregated random variables). The resource balancer may then infer statistical information (e.g., mean variance, standard deviation, etc.) about an expected distribution of loads for each load metric of a node.

In an example, the resource balancer is configured to infer the statistical information in accordance with principles of the Central Limit Theorem. The resource balancer determines the likelihood that a given load metric will exceed the capacity based on the inferred statistical information and a predetermined tolerance (e.g., a proximity to the capacity), and selectively triggers a rebalancing of the loads across the nodes in the node cluster accordingly. Further, the resource balancer may use the inferred statistical information to determine how to rebalance the loads. As used herein, the terms "likelihood" and "probability" may be used interchangeably.

Figure 1:
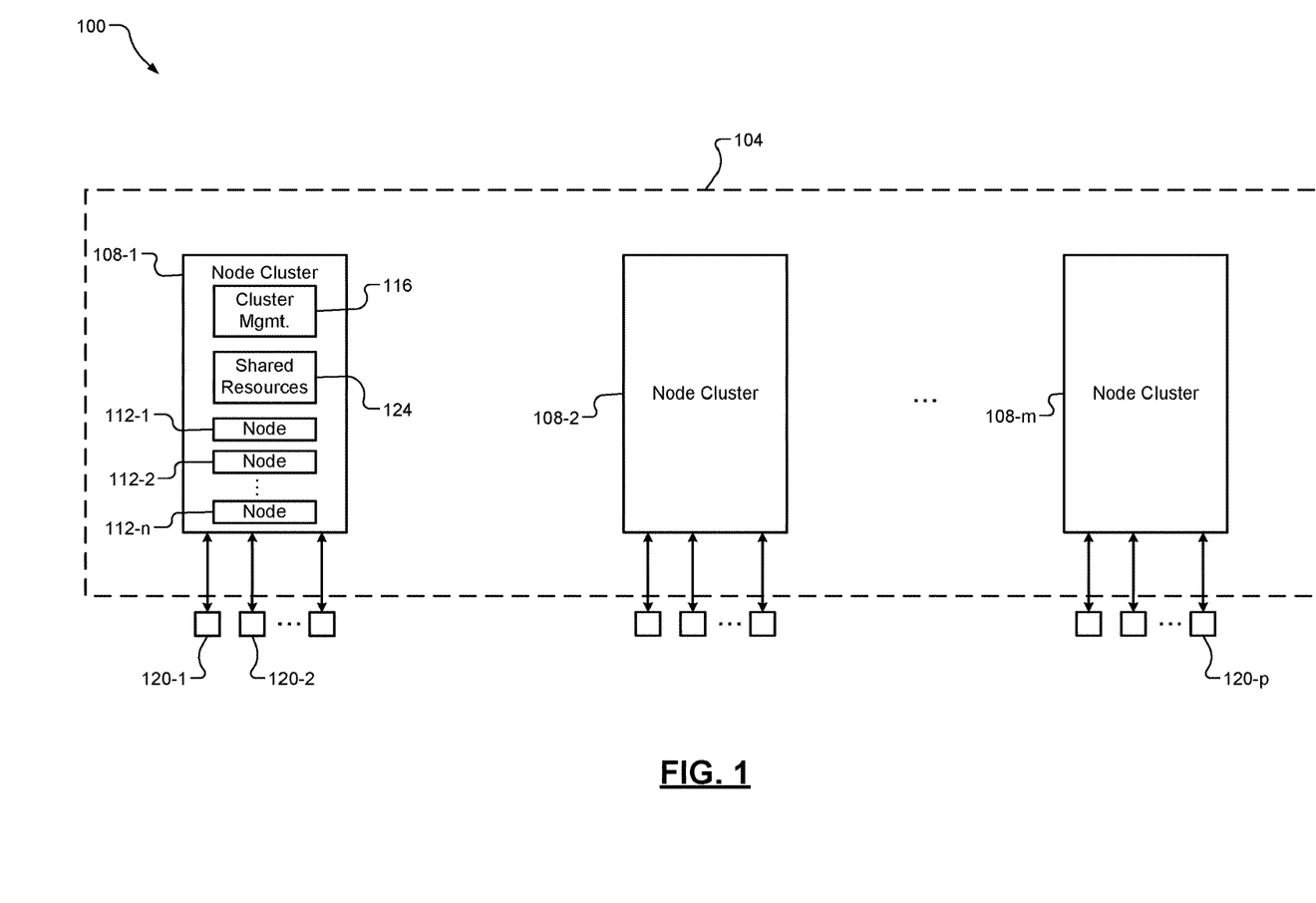
FIG. 1 is an example cloud computing system according to the principles of the present disclosure.

Referring now to FIG. 1, a system 100 implementing a cloud computing system or platform 104 includes a plurality of node clusters 108-1, 108-2, . . . , 108-m, referred to collectively as node clusters 108. The node clusters 108 may be locally or remotely located with respect to each other. The node clusters 108 each include a plurality of nodes 112-1, 112-2, . . . , 112-n (referred to collectively as nodes 112) and a respective cluster management module 116. The cluster management module 116 implements resource allocation and management as well as management of other cloud computing services. For example only, the cluster management module 116 may correspond to and/or implement the resource balancer according to the principles of the present disclosure. In some examples, each of the node clusters 108 corresponds to a computer or rack configured to house the respective nodes 112.

Although the node cluster 108-1 is shown having n nodes, it is to be understood that the other node clusters 108-2, . . . , 108-m may include n or another number of nodes. For example only, each of the node clusters 108 may include 16 of the nodes 112. In other words, the node cluster 108-1 may include 16 nodes 112-1 . . . 112-16. Similarly, the node cluster 108-2 may include another 16 nodes 112-1 . . . 112-16 that are different from the nodes of the node cluster 108-1. Further, although shown separate from the nodes 112, the cluster management module 116 may also be integrated with one or more of the nodes 112.

A plurality of client devices or stations 120-1, 120-2, . . . , 120-p (referred to collectively as client stations 120) interface with the cloud computing system 104. The nodes 112 are configured to execute and provide various services (e.g., processing, service applications, data storage, etc.) for the client stations 120. Each of the nodes 112 may provide the same services or, in some examples, one or more of the nodes 112 may provide specialized services. For example only, each of the client stations 120 may execute applications that interface with virtual machines (VMs) implemented on the nodes 112. The VMs provide the services using various resources, including hardware and software resources.

Each of the nodes 112 may implement and operate using respective resources, and/or the nodes 112 may be supported by shared resources 124. In some examples, each resource may be configured to support specific applications or services, and each service application may be divided into separate functional portions (which may be referred to as "roles"). Each role may be associated with a different virtual machine or node, and each role may have one or more instances hosted on the cloud computing system 104. For example, each role may correspond to a component program for performing respective functions of a service application.

Each instance of a role may be assigned to one of the nodes 112. Accordingly, respective resources associated with each of the nodes 112 are consumed by role instances assigned to the nodes 112. A more detailed description of roles and instances and the corresponding balancing of resources can be found in U.S. patent application Ser. No. 14/852,233, filed on Sep. 11, 2015, which is hereby incorporated herein in its entirety.

Figure 2:
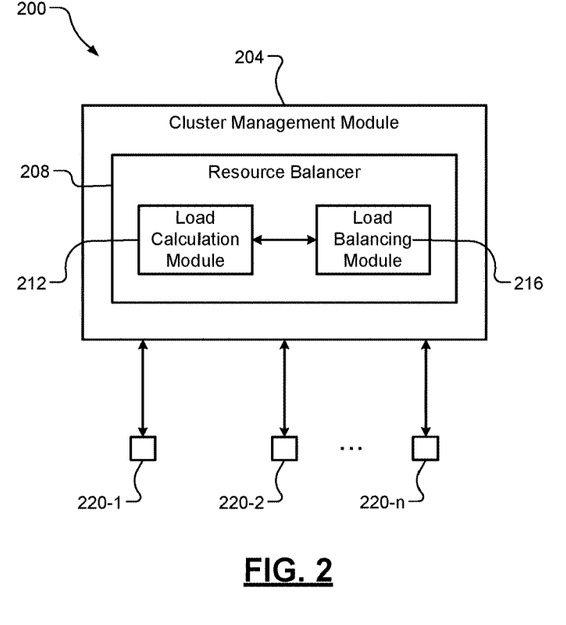
FIG. 2 is a cluster management module including an example resource balancer according to the principles of the present disclosure.

An example system 200 including a cluster management module 204 according to the principles of the present disclosure includes a resource balancer 208. Although the cluster management module 204 may include other components corresponding to management of various cloud computing services, for simplicity only the resource balancer 208 is shown.

The resource balancer 208 may include a load calculation module 212 and a load balancing module 216. The resource balancer 208 manages resource allocation for a plurality of nodes 220-1, 220-2, . . . , and 220-n, referred to collectively as nodes 220. For example, the load calculation module 212 monitors load metrics associated with the nodes 220 and determines respective likelihoods that any of the load metrics will exceed associated capacities according to the principles of the present disclosure (e.g., using inferred statistical information about an expected distribution of loads for each load metric associated with the nodes 220). The load balancing module 216 selectively rebalances loads based on the determination according to the principles of the present disclosure (e.g., using the inferred statistical information).

In one example, the load calculation module 212 monitors load metrics and other operating parameters associated with the nodes 220 (e.g., as reported by the nodes 220) to calculate information such as mean, variance, and standard deviation of the expected distribution of loads across the nodes 220 using principles of the Central Limit Theorem. The calculated standard deviation for a given load metric of a node can then be used to determine a likelihood that the load metric will exceed an associated load capacity. For example, the determination may correspond to a relationship between (i) a difference between an average consumption of a load metric and an associated load capacity and (ii) the standard deviation for the load metric.

For example, a load metric such as "Memory" may have an associated load capacity of 1000 for one of the nodes 220, an average consumption of the Memory load metric may be 800, and a standard deviation of the consumption of the Memory load metric may be 250. Accordingly, the average consumption is less than one standard deviation from the load capacity. The load calculation module 212 is configured to selectively trigger load rebalancing based on this relationship between the average consumption, the load capacity, and the standard deviation, and further based on a predetermined policy tolerance value (e.g., in accordance with a service level agreement, or SLA).

For example, the tolerance value may indicate a minimum number of standard deviations (i.e., a buffer of a predetermined number of standard deviations). If the difference between the average consumption and the load capacity is less than the indicated number of standard deviations, the load calculation module 212 may trigger a load rebalancing. Accordingly, in the above example, if the tolerance value is 1 standard deviation (which may be referred to as a sigma policy of 1), the average consumption of 800 is less than 1 standard deviation of 250 from the load capacity of 1000, and therefore the load calculation module 212 may trigger a load rebalancing. Conversely, if the calculated standard deviation is 50 and the tolerance value is 3 standard deviations (i.e., 150, or a sigma policy of 3), then the average consumption of 800 would not trigger a load rebalancing.

The resource balancer 208 stores policy information including respective predetermined policy tolerance values for each load metric for all of the nodes 220. Accordingly, the resource balancer 208 is configured to selectively rebalance loads based on the inferred statistical information and the policy information for each of the nodes 220. In some examples, the policy information corresponds to default load rebalancing parameters, which may be selectively overridden for individual nodes, clusters, etc. in accordance with other inputs.

The load calculation module 212 may calculate the mean and variance for each load metric based on load reports received from the nodes 220. For example, for a given service, the load calculation module 212 may receive load reports $I_{t1}, I_{t2}, \ldots, I_{tn-1}, I_{tn}$, at respective times $t_1, t_2, \ldots t_{n-1}, t_n$, which may correspond to integers, and performs aggregation operations on the load reports. Each of the aggregation operations may be incremental, idempotent, and associative. For example, "incremental" indicates that a given operation always results in a new value $V_{tn}$ based on a current value $V_{tn-1}$ (e.g., $V_{tn}=\text{Func}(I_{t1}, I_{t2}, I_{t3}, \ldots I_{tn})=\text{Func}(V_{tn-1}, I_{tn})$. "Idempotent" indicates that, when applying a given operation again, the value $V_{tn}$ does not change (e.g., $V_{tn}=\text{Func}(V_{tn}, I_{tn})$. "Associative" indicates that a given operation can be calculated in multiple stages (e.g., $\text{Func}(I_1, I_2, I_3)=\text{Func}(\text{Func}(I_1, I_2), I_3)=\text{Func}(I_1, \text{Func}(I_2, I_3))$).

For example only, the load calculation module 212 performs the following aggregation operations on the load reports.

Count, which corresponds to the number of load reports:

$\text{Count}_0=0$ $\text{Count}_n=\text{Count}_{n-1}+1$

Sum, which corresponds to the sum of all load reports:

$\text{Sum}_0=0$ $\text{Sum}_n=\text{Sum}_{n-1}+I_n$

SquaredSum, which corresponds to the squared sum of all load reports:

$\text{SquredSum}_0=0$ $\text{SquaredSum}_n=\text{SquaredSum}_{n-1}+I_n^2$

SumOfWeight, where $0<a\leq1$, t0 is the time a given service was created, and T is a LoadDecayInterval:

$\text{SumOfWeight}_0=0$ $\text{SumOfWeight}_n=\text{SumOfWeight}_{n-1}+a^{-(tn-t0)/T}$ WeightedSum, which corresponds to the weighted combination of all load reports, where a history weight is exponentially decayed, $0<a\leq1$ and corresponds to a in the SumOfWeight calculation, and t0 is the time the service was created:

$\text{WeightedSum}_0=0$ $\text{WeightedSum}_n=\text{WeightedSum}_{n-1}+I_n*a^{-(tn-t0)/T}$ In some examples, the load calculation module 212 may calculate a "smoothed load" using a weighted combination of the load history (i.e., the plurality of load reports) and a predetermined default load ("DefaultLoad") according to:

$$\text{SmoothedLoad} = \frac{\text{DefaultLoad} + \text{WeightedSum}_n}{1 + \text{SumOfWeight}_n}$$

The load calculation module 212 calculates the average or mean consumption of a given load metric according to:

$$\text{Mean}_n = \mu_n = \frac{\text{Sum}_n}{\text{Count}_n}$$

The load calculation module 212 calculates the variance of a given load metric according to:

$$\text{Variance} = \sigma^2 = \frac{\text{SquaredSum}_n}{\text{Count}_n} - \text{Mean}_n^2$$

The load calculation module 212 may calculate the above values each time a new load report is received. Accordingly, the calculated values may correspond to a running, or moving, average. For example, calculated values for variance, standard deviation, etc. may correspond to a running calculation. In some examples, each of the load reports in the load history for a given metric may be weighted or otherwise adjusted. For example, more recent load reports may be assigned a greater weight than older load reports.

The Sum of the load reports ($\text{Sum}_n$) for a given load metric is indicative of a representative mean and variance of the consumed resource according to the principles of the Central Limit Theorem, which states that the average or mean of a sufficiently large number of random variables will have an approximately normal distribution regardless of the underlying distribution. Accordingly, if the statistical information such as the calculated mean and variance are treated as random variables under the Central Limit Theorem, a probability that consumption of a given load metric will remain within load capacity has a Gaussian distribution N'. For example, for m role instances on a node, each having a mean $\mu_i$ and a standard deviation $\sigma_i$, the total load on the node (e.g., if sampled at any given moment) will have a Gaussian distribution $N'(\mu', \sigma'^2)$, in accordance with $N'(\mu', \sigma'^2)=N'(\mu_1+\mu_2 \ldots +\mu_m, \sigma_1^2+\sigma_2^2 \ldots +\sigma_m^2)$.

Figure 3:
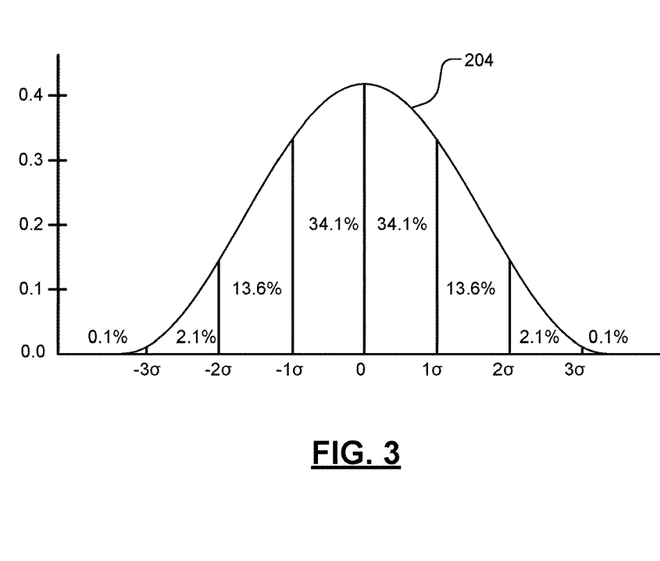
FIG. 3 is an example Gaussian distribution of probabilities of exceeding a load capacity according to the principles of the present disclosure.

FIG. 3 illustrates an example Gaussian distribution 300 of load values for a given load metric. Accordingly, respective amounts of probability p % contained under the Gaussian distribution N' are shown below in Table 1 for various values:

| p % | Value |
|---|---|
| 50% | $\mu$ |
| 84.1% | $\mu + \sigma$ |
| 97.7% | $\mu + 2\sigma$ |
| 99.8% | $\mu + 3\sigma$ |

Accordingly, 50% of values from a distribution of a metric are below the average load $\mu$, 84.1% of the values are within $\mu+\sigma$ (i.e., within one standard deviation), 97.7% of the values are within $\mu+2\sigma$ (i.e., within two standard deviations), and 99.8% of the values are within $\mu+3\sigma$ (i.e., within three standard deviations). Accordingly, if a policy tolerance value is $\sigma$ (i.e., a sigma policy of 1, or 1 standard deviation from the load capacity), the policy requires an 84.1% probability that the load will remain within the associated load capacity, assuming that violating this policy tolerance value triggers a load rebalancing. If the policy tolerance value is $2\sigma$ (i.e., a sigma policy of 2), there is a 97.7% probability that the load will remain within the associated load capacity. If the policy tolerance value is $3\sigma$ (i.e., a sigma policy of 3), there is a 99.8% probability that the load will remain within the associated load capacity. Accordingly, as the tolerance value increases by increments of the standard deviation $\sigma$, the likelihood that the load will remain within the associated load capacity increases while, conversely, the likelihood that the load will exceed the associated load capacity decreases.

The load calculation module 212 provides the calculated statistical information including, but not limited to, the calculated mean, variance, and standard deviation for each load metric to the load balancing module 216. The load balancing module 216 selectively triggers load rebalancing according to the received statistical information as described below in more detail.

Typically, load rebalancing may be triggered in response to one or more criteria being met. For example, load rebalancing may be triggered if the load metrics indicate that the loads are not balanced across nodes. Example criteria include, but are not limited to, the load for a given metric exceeding a predetermined threshold, a ratio of a load on a most loaded one of the nodes 220 to a load on a least loaded one of the nodes 220 exceeding a balancing threshold, etc. The load balancing module 216 according to the principles of the present disclosure is configured to replace and/or supplement these criteria with the statistical information received from the load calculation module 212. For example, the load balancing module 216 may trigger a load rebalancing in response to the average load on any load metric of a node being within the number of standard deviations of the load capacity as indicated by the selected policy tolerance value (i.e., in response to the average load exceeding a value 1 standard deviation from the load capacity, 2 standard deviations from the load capacity, etc.).

Further, the load balancing module 216 may trigger a load rebalancing based on a relationship between a probability associated with a node most likely to exceed a load capacity, a probability of a node least likely to exceed a load capacity, and a rebalancing threshold. For example, rather than merely comparing loads of the most and least loaded nodes, the load balancing module 216 may calculate the respective probabilities that each of the respective nodes 220 will exceed the load capacity of a load metric and then determine a ratio (e.g., a probability ratio) of the greatest calculated probability to the lowest calculated probability. In one example, the load balancing module 216 calculates respective probabilities for all load metrics on a node, and then determines a probability that any load metric for that node will exceed its load capacity. Accordingly, the greatest calculated probability corresponds to the node having the highest probability that any of the load metrics on that node will exceed its capacity. Conversely, the lowest calculated probability corresponds to the node having the lowest probability that any of the load metrics on that node will exceed its capacity.

The load balancing module 216 compares the probability ratio to a balancing threshold and triggers a load rebalancing if the probability ratio exceeds the balancing threshold. For example only, the load balancing module 216 may calculate the respective probabilities that any load metric of a node will exceed the load capacity based on the Gaussian distribution 300 of load values and the calculated mean and standard deviation for each load metric.

For example only, in an example system with only two nodes and a single load metric, a first node may have the highest load (e.g., 800) for a given load metric having a load capacity of 1000, with a standard deviation of 50. Conversely, a second node may have the lowest load (e.g., 200) with a standard deviation of 100. Accordingly, regardless of whether these nodes are considered to be "equally utilized" (i.e., roughly equal loads), the load balancing module 216 may not trigger a load rebalancing since both nodes have an extremely low probability of exceeding the load capacity. For example, a ratio of the respective probabilities would be approximately 1. If the rebalancing threshold is 2, the load balancing module 216 would therefore not trigger a load rebalancing.

Conversely, if the first node has a load of 700 with a standard deviation of 350, the probability that the first node will exceed the load capacity is relatively high. If the second node has a load of 800 with a standard deviation of 50, the probability that the second node will exceed the load capacity is relatively low. Accordingly, the ratio of the respective probabilities would exceed a rebalancing threshold of 2 and the load balancing module 216 would trigger a load rebalancing.

To perform load rebalancing, the load balancing module 216 according to the principles of the present disclosure is configured to rebalance the loads across the nodes 220 using the statistical information received from the load calculation module. For example, the load balancing module 216 may calculate, for each node, an amount of probability of each load metric exceeds the associated load capacity (which corresponds to a probability that the load for the load metric on that node will exceed the load capacity) and combine the respective probabilities for all nodes. The load balancing module 216 rebalances the loads based on the combination of the calculated probabilities as described below in more detail.

As described herein, load distribution alone is not necessarily indicative of equal utilization because a heavily loaded node with a large mean and a small variance may be less likely to exceed the load capacity than a lightly loaded node with a smaller mean but a large variance. Accordingly, the load balancing module 216 according to the present disclosure determines (e.g., based on the statistical information, including the Gaussian distribution 300) the amount of probability above capacity on each node (i.e. the probability that each node will exceed the load capacity).

For example, rebalancing may include iteratively reassigning instances to each node until a desired "balance" (e.g., relatively equal load across the nodes 220) is achieved. Rebalancing may generate multiple different hypothetical configurations of instance locations across the nodes 220 until a configuration satisfying the desired load balancing is achieved. Accordingly, during load rebalancing, the load balancing module 216 may assign instances (and, therefore, their associated loads) to each node until assigning an additional instance on a node would cause the probability of any node exceeding the load capacity for a given load metric to increase more than assigning that instance to a different node would cause the probability to increase.

In one example, the probability that any node will exceed the load capacity may correspond to a weighted combination of probabilities calculated by the load balancing module 216. For example, for a given load metric, the load balancing module 216 may combine respective probabilities, across all nodes, that the load metric will exceed capacity ("a combined load metric probability"). Accordingly, each load metric in a cluster of nodes has an associated combined load metric probability. The load balancing module 216 then sums (e.g., using a weighted sum) all of the combined load metric probabilities for the respective load metrics to generate the weighted combination of probabilities corresponding to the probability that any node will exceed the load capacity for any metric.

Accordingly, if assigning an instance to a first node causes the amount of probability above capacity for the first node to increase by X (i.e., based on the average, variance, etc. associated with that instance), then the combination of probabilities also increases. However, if assigning the instance to a second node causes the amount of probability above capacity for the second node to increase by Y, where Y<X, then assigning the instance to the second node causes the combination of probabilities across the nodes 220 to increase less than assigning the instance to the first node. In this manner, the load balancing module 216 iteratively reassigns the instances across the nodes 220 to minimize the combination of probabilities.

In some situations, variance for a given instance may have a variance or standard deviation of approximately zero. As such, that instance can be assigned to a greater amount of nodes without significantly affecting the combination of probabilities. Further, a situation where many instances on a given node have a variance of zero or approximately zero may result in a configuration where that node is heavily loaded relative to all other nodes. Accordingly, to prevent the possibility that a node will be heavily loaded in this manner with many instances having a variance of zero or approximately zero, each instance may be assigned a default or minimum variance. For example, setting a default variance allows the load balancing module 216 to perform initial balancing across the nodes 220 prior to receiving sufficient load reports to actually calculate the statistical information including respective means, variances, etc. For example only, a default variance for each instance may be set to a square root of a predetermined default load.

Conversely, a minimum variance may be set to a predetermined minimum based on user settings, a minimum calculated variance of any instance on a node in the cluster, a predetermined minimum as set by the SLA policy, etc. In this manner, even if the calculated variance is zero or approximately zero for a given instance, the load balancing module 216 may still assign a minimum variance to the instance for load rebalancing purposes.

Figure 4:
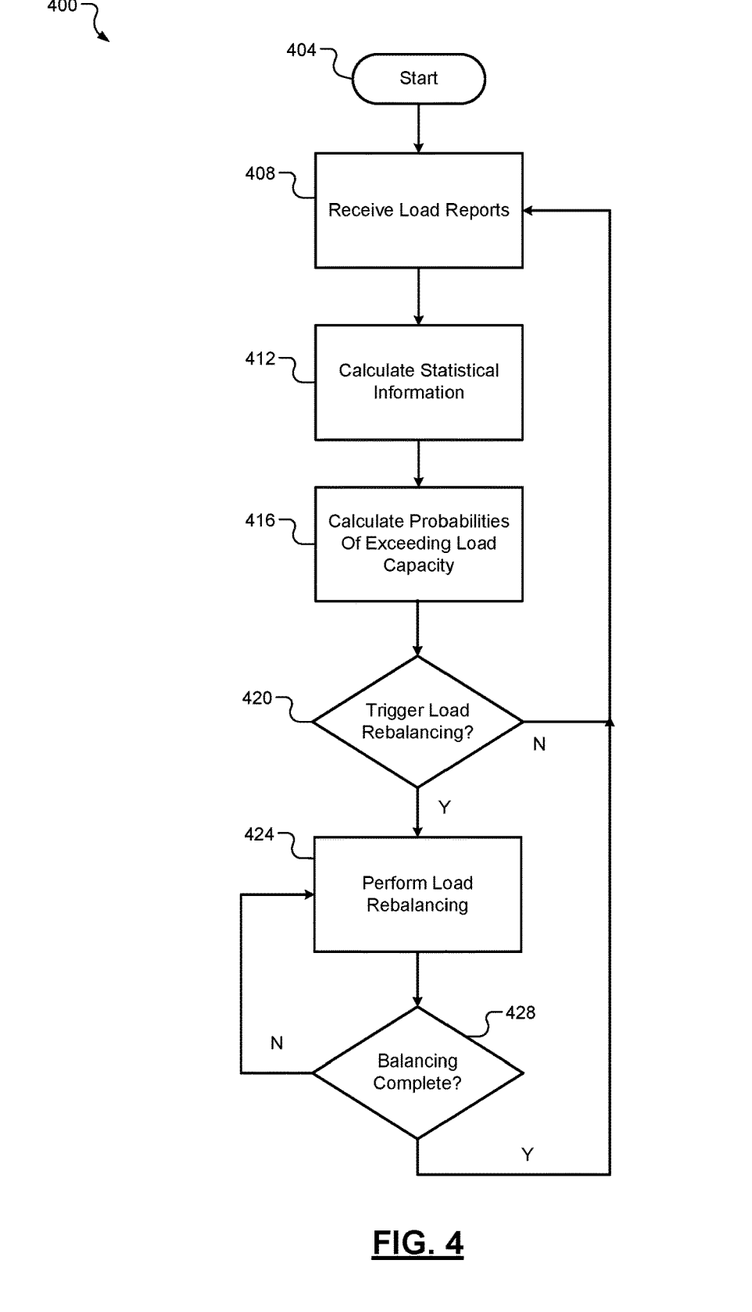
FIG. 4 illustrates steps of an example load calculation and balancing method according to the principles of the present disclosure.

Referring now to FIG. 4, an example load calculation and balancing method 400 according to the principles of the present disclosure begins at 404. At 408, the method 400 (e.g., the load calculation module 212) receives a plurality of load reports from respective nodes. At 412, the method 400 (e.g., the load calculation module 212) calculates statistical information about respective load metrics based on the load reports. For example, calculating the statistical information may include, but is not limited to, performing one or more aggregation operations on the load reports (e.g. a count, a sum, a squared sum, a sum of weight, a weighted sum, etc.) and calculating a mean, variance, and standard deviation using results of the aggregation operations.

At 416, the method 400 (e.g., the load calculation module 212) calculates respective probabilities that each instance will exceed a load capacity for a corresponding node using the statistical information. The method 400 may calculate the respective probabilities according to principles of the Central Limit Theorem. For example, the method 400 determines, using the statistical information, a Gaussian distribution of probabilities of load values for a given metric being within one, two, or three standard deviations of the average load.

At 420, the method 400 (e.g., the load balancing module 216) determines whether to trigger a load rebalancing based on the calculated probabilities. For example, the method 400 determines whether a ratio (e.g., a probability ratio) of the greatest calculated probability for one of the nodes to exceed a load capacity to the lowest calculated probability for one of the nodes to exceed a load capacity exceeds a rebalancing threshold, and/or determines whether the load for a given load metric exceeds a policy tolerance value. If true, the method 400 continues to 424. If false, the method 400 continues to 408. At 424, the method 400 (e.g., the load balancing module 216) performs load rebalancing based on the calculated probabilities. For example, the method 400 calculates a combination of respective probabilities that the nodes will exceed a load capacity and performs the load rebalancing based on the calculated combination of respective probabilities.

At 428, the method 400 (e.g., the load balancing module 216) determines whether load rebalancing is complete. For example, the method 400 updates the calculated combination based on the reassignment of instances to nodes performed during rebalancing and determines whether load rebalancing is complete based on the updated combination (e.g., based on whether the updated combination is less than a threshold, based on whether reassigning any of the instances would further reduce the sum, etc.). If true, the method 400 continues to 408. If false, the method 400 continues to 424 to attempt to further reduce the combination of respective probabilities.

Figure 5:
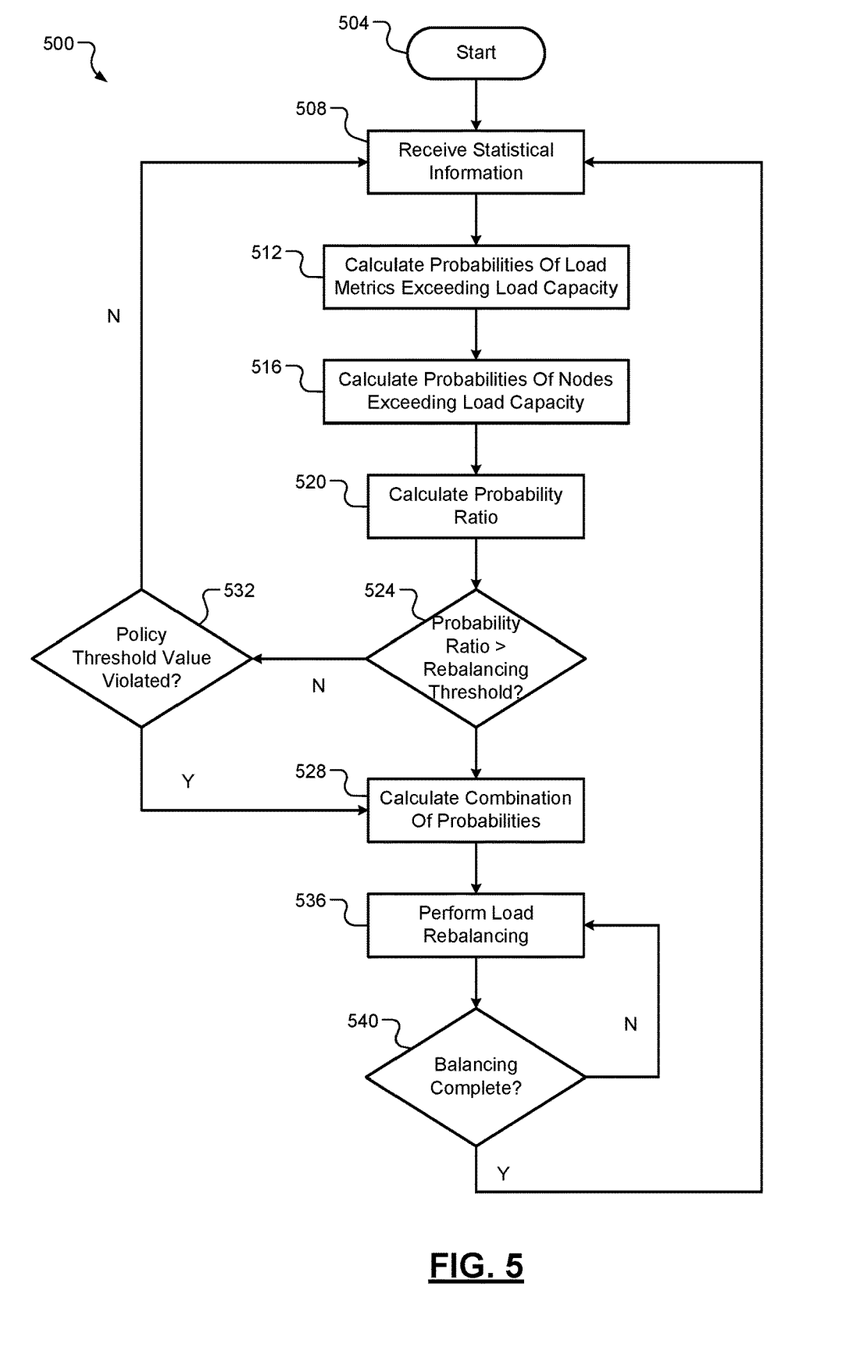
FIG. 5 illustrates steps of an example load balancing method according to the principles of the present disclosure.

Referring now to FIG. 5, an example load balancing method 500 begins at 504. At 508, the method 500 (e.g., the load balancing module 216) receives statistical information associated with various nodes. For example, the statistical information may include a respective mean, variance, and standard deviation of load for each load metric, as well as a Gaussian distribution of probabilities of load values for each load metric. In some examples, the method 500 may also receive policy information (e.g., SLA policy information) indicating tolerance values for each load metric. For example, the tolerance values may indicate a buffer of a number of standard deviations from the load capacity the average load is required to be for each load metric.

At 512, the method 500 (e.g., the load balancing module 216) calculates, using the statistical information, a respective amount of probability of each load metric that exceeds an associated load capacity on each node. At 516, the method 500 (e.g., the load balancing module 216) calculates, for each node, a respective probability that any load metric for that node will exceed the load capacity. For example only, the respective probability for each node may correspond to a combination of the respective probabilities for all load metrics for that node, a weighted average of the respective probabilities for all load metrics for that node, etc.

At 520, the method 500 (e.g., the load balancing module 216) calculates a probability ratio. For example, the probability ratio corresponds to a ratio of the greatest calculated probability for a node to a lowest calculated probability for a node. At 524, the method 500 (e.g., the load balancing module 216) determines whether the probability ratio exceeds a rebalancing threshold. If true, the method 500 continues to 528. If false, the method 500 continues to 532. At 532, the method 500 (e.g., the load balancing module 216) determines whether any of the load metrics on any node violates a policy threshold value. For example, the policy threshold value may correspond to a buffer based on a selected number of standard deviations from the load capacity. Accordingly, the method 500 determines whether each load metric violates the policy threshold value based on the average load and the standard deviation of the load for the load metric. If true, the method 500 continues to 528. If false, the method 500 continues to 508.

At 528, the method 500 (e.g., the load balancing module 216) calculates a combination of the respective probabilities that each node will exceed a load capacity. At 536, the method 500 (e.g., the load balancing module 216) rebalances the loads based on the combination of the respective probabilities as described above with respect to FIG. 2. At 540, the method 500 (e.g. the load balancing module 216) determines whether rebalancing is complete. For example, the method 500 updates the combination of the respective probabilities according to the rebalanced loads and determines whether the updated sum is less than a threshold, whether further rebalancing the loads would further reduce the combination, etc. If true, the method 500 continues to 508. If false, the method 500 continues to 536.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   at least one processor; and
   memory in electronic communication with the at least one processor; and
   instructions stored in the memory, the instructions being executable to:
   receive load reports for respective load metrics associated with nodes from a cluster of nodes in a cloud computing system, wherein the load reports are indicative of respective loads on a plurality of resources provided by the nodes, and wherein the respective load metrics include a respective plurality of load metrics for each of the nodes;
   calculate, based on the received load reports, an expected distribution of loads across the nodes for each load metric;
   calculate, based on the expected distribution of loads, first probabilities that each of the plurality of load metrics for each node will exceed a respective predetermined capacity for each node;
   calculate, based on the calculated first probabilities, second probabilities that any one of the plurality of load metrics for each node will exceed the predetermined capacity; and
   selectively balance, based on the second calculated probabilities, the loads on the resources provided by the nodes.

2. The system of claim 1, wherein the expected distribution of loads corresponds to a Gaussian distribution.

3. The system of claim 1, further comprising instructions being executable by the at least one processor to calculate statistical information for each load metric using the load reports.

4. The system of claim 3, wherein the statistical information includes at least one of an average load, a variance, and a standard deviation.

5. The system of claim 4, wherein the load reports include a plurality of load reports received for each load metric and the statistical information includes an aggregation of the plurality of load reports for each load metric.

6. The system of claim 5, wherein the aggregation includes at least one of a count of the plurality of load reports for each load metric, a sum of the plurality of load reports for each metric, and a squared sum of the plurality of load reports for each metric.

7. The system of claim 1, wherein selectively balancing the loads comprises (i) calculating a probability ratio, wherein the probability ratio corresponds to a ratio of a highest one of the calculated second probabilities to a lowest one of the calculated second probabilities, and (ii) selectively balancing the loads based on a comparison between the probability ratio and a rebalancing threshold.

8. The system of claim 1, wherein selectively balancing the loads comprises determining whether an average load on one of the nodes violates a policy threshold value.

9. The system of claim 8, wherein the policy threshold value corresponds to a buffer of a predetermined number of standard deviations away from the respective predetermined capacity.

10. The system of claim 1, further comprising instructions being executable by the at least one processor to rebalance the loads across the nodes based on a weighted combination of the calculated second probabilities.

11. A method of balancing loads across a cluster of nodes in a cloud computing system, the method comprising:

receiving load reports for respective load metrics associated with the nodes, wherein the load reports are indicative of respective loads on a plurality of resources provided by the nodes, and wherein the respective load metrics include a respective plurality of load metrics for each of the nodes;

calculating, by at least one processor and based on the received load reports, an expected distribution of loads across the nodes for each load metric;

calculating, by the at least one processor and based on the expected distribution of loads, first probabilities that each of the plurality of load metrics for each node will exceed a respective predetermined capacity for each node;

calculating, by the at least one processor and based on the calculated first probabilities, second probabilities that any one of the plurality of load metrics for each node will exceed the predetermined capacity; and selectively balancing, by the at least one processor and based on the calculated second probabilities, the loads on the resources provided by the nodes.

12. The method of claim 11, wherein the expected distribution of loads corresponds to a Gaussian distribution.

13. The method of claim 11, wherein calculating the expected distribution of loads includes calculating statistical information for each load metric using the load reports.

14. The method of claim 13, wherein the statistical information includes at least one of an average load, a variance, and a standard deviation.

15. The method of claim 14, wherein the load reports include a plurality of load reports received for each load metric and the statistical information includes an aggregation of the plurality of load reports for each load metric.

16. The method of claim 15, wherein the aggregation includes at least one of a count of the plurality of load reports for each load metric, a sum of the plurality of load reports for each metric, a sum of the plurality of load reports for each metric, and a squared sum of the plurality of load reports for each metric.

17. The method of claim 11, wherein selectively balancing the loads includes (i) calculating a probability ratio, wherein the probability ratio corresponds to a ratio of a highest one of the calculated second probabilities to a lowest one of the calculated second probabilities, and (ii) selectively balancing the loads based on a comparison between the probability ratio and a rebalancing threshold.

18. The method of claim 11, wherein selectively balancing the loads includes determining whether an average load on one of the nodes violates a policy threshold value, and wherein the policy threshold value corresponds to a buffer of a predetermined number of standard deviations away from the respective predetermined capacity.

19. The method of claim 11, further comprising rebalancing the loads across the nodes based on a weighted combination of the calculated second probabilities.

20. A non-transitory computer readable medium comprising instructions thereon that, when executed by at least one processor, causes a computer system to:

receive load reports for respective load metrics associated with nodes from a cluster of nodes in a cloud computing system, wherein the load reports are indicative of respective loads on a plurality of resources provided by the nodes, wherein the load reports include a plurality of load reports for each of the load metrics, and wherein the respective load metrics include a respective plurality of load metrics for each of the nodes;

calculate, using the plurality of load reports for each of the load metrics, an average load and at least one of a variance and a standard deviation;

calculate an expected distribution of loads across the nodes for each load metric;

calculate, based on the expected distribution of loads, the average load, and the at least one of the variance and the standard deviation, first probabilities that each of the plurality of load metrics for each node will exceed a respective predetermined capacity for each node;

calculate, based on the calculated first probabilities, second probabilities that any one of the plurality of load metrics for each node will exceed the predetermined capacity; and selectively balance, based on at least one of the calculated second probabilities and respective policy threshold values associated with the load metrics, the loads on the resources provided by the nodes.

* * * * *